United States Patent
Huang et al.

(10) Patent No.: US 11,711,591 B2
(45) Date of Patent: Jul. 25, 2023

(54) COMMON-MODE FILTERING FOR HIGH-SPEED CABLE INTERFACE

(71) Applicant: Marvell Asia Pte, Ltd., Singapore (SG)

(72) Inventors: Shaowu Huang, Sunnyvale, CA (US); Dance Wu, Palo Alto, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 52 days.

(21) Appl. No.: 17/302,190

(22) Filed: Apr. 27, 2021

(65) Prior Publication Data

US 2021/0352376 A1 Nov. 11, 2021

Related U.S. Application Data

(60) Provisional application No. 63/152,205, filed on Feb. 22, 2021, provisional application No. 63/020,695, filed on May 6, 2020.

(51) Int. Cl.
*H04N 21/61* (2011.01)
*H04B 3/56* (2006.01)

(52) U.S. Cl.
CPC ........... *H04N 21/6118* (2013.01); *H04B 3/56* (2013.01)

(58) Field of Classification Search
CPC ... H04N 21/6118; H04N 7/17309; H04B 3/56
See application file for complete search history.

(56) References Cited

U.S. PATENT DOCUMENTS

| 10,642,767 | B1 | 5/2020 | Farjadrad |  |
|---|---|---|---|---|
| 2013/0293230 | A1* | 11/2013 | Schneider | G01R 33/5612 324/309 |
| 2019/0342124 | A1* | 11/2019 | Bhagwat | H04L 25/0266 |
| 2021/0036897 | A1* | 2/2021 | Gardner | H04L 25/0292 |

* cited by examiner

*Primary Examiner* — Sung S Ahn (57) ABSTRACT

A radiofrequency (RF) wireline communications system includes an interference filter for filtering interference noise at a cable interface that couples a cable of the system to functional circuitry. The interference filter includes a first termination resistance element coupled between a first cable conductor and a system ground, and a first termination reactance element coupled to the first termination resistance element. The first termination reactance element has a first termination reactance value selected to direct signals on the first cable conductor, having predetermined frequency characteristics, away from the system ground, and the first termination resistance element has a first termination resistance value selected as a pull-down resistance for interference signals having other than the predetermined frequency characteristics, that are not directed by the first termination reactance element away from the system ground, to cause the interference signals, having other than the predetermined frequency characteristics, to propagate to the system ground.

26 Claims, 5 Drawing Sheets

COMMON-MODE FILTERING FOR HIGH-SPEED CABLE INTERFACE

CROSS REFERENCE TO RELATED APPLICATIONS

This disclosure claims the benefit of commonly-assigned United States Provisional Patent Applications Nos. 63/020,695 and 63/152,205, filed May 6, 2020 and Feb. 22, 2021, respectively, each of which is hereby incorporated by reference herein in its respective entirety.

FIELD OF USE

This disclosure relates to common-mode filtering for a high-speed cable interface. More particularly, this disclosure relates to improving filtering of common-mode noise in a high-speed cable interface without impairing high-speed signaling, by incorporating a common-mode filtering network or circuitry in the cable interface.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Wireline communication links for some high-speed networking applications operate under various standards that incorporate strict electromagnetic compatibility (EMC) requirements including noise filtering. However, filtering of common-mode noise may impair high-speed signaling, particularly differential signaling, but also single-ended signaling. Moreover, this issue arises not only in unshielded cables, but also in shielded cables.

SUMMARY

A radiofrequency (RF) wireline communications system according to implementations of the subject matter of this disclosure includes an interference filter for filtering interference noise at a cable interface that couples a cable of the RF wireline communications system to functional circuitry of the RF wireline communications system. The interference filter includes a first termination resistance element coupled between a first cable conductor and a system ground, and a first termination reactance element coupled to the first termination resistance element. The first termination reactance element has a first termination reactance value selected to direct signals on the first cable conductor, having predetermined frequency characteristics, away from the system ground, and the first termination resistance element has a first termination resistance value selected as a pull-down resistance for interference signals having other than the predetermined frequency characteristics, that are not directed by the first termination reactance element away from the system ground, to cause the interference signals, having other than the predetermined frequency characteristics, to propagate to the system ground.

A first implementation of such an RF wireline communications system may further include, when the cable interface of the RF wireline communications system is a differential signal interface in which the first cable conductor is configured to carry one leg of a differential signal and a second cable conductor is configured to carry another leg of the differential signal, a second termination resistance element coupled between the second cable conductor and the system ground, and a second termination reactance element coupled to the second termination resistance element. The second termination reactance element may have a second reactance value selected to direct signals on the second cable conductor, having the predetermined frequency characteristics, away from the system ground, and the second termination resistance may have a second resistance value selected as a pull-down resistance for interference signals having other than the predetermined frequency characteristics, that are not directed by the second termination reactance element away from the system ground, to cause the interference signals having other than the predetermined frequency characteristics, to propagate to the system ground.

In a first instance of that first implementation, the second termination resistance value of the second termination resistance element may be equal to the first termination resistance value of the first termination resistance element.

In a second instance of that first implementation, the second termination reactance value of the second termination reactance element may be equal to the first termination reactance value of the first termination reactance element.

In a second implementation of such an RF wireline communications system, the first termination reactance element having the first termination reactance value is a first termination inductance element having a first termination inductance value.

In a first instance of that second implementation, the first termination inductance element may be coupled in series with the first termination resistance element between the first cable conductor and the system ground, and the predetermined frequency characteristics may include frequencies above a predetermined cutoff frequency.

In a first variant of that first instance of the second implementation, the first termination resistance value of the first termination resistance element may be between 330Ω and 500Ω, inclusive.

In a second variant of that first instance of the second implementation, the first termination inductance value of the first termination inductance element may be between 100 nH and 220 nH, inclusive, to block signals above a predetermined frequency between 100 MHz and 300 MHz, inclusive.

According to that second variant of the first instance of the second implementation, the first termination inductance value of the first termination inductance element may be 100 nH, to block signals above a predetermined frequency of 300 MHz.

In a second instance of that second implementation, the first termination inductance element may be coupled in series with an additional resistance element, between the first cable conductor and the system ground, and in parallel with the first termination resistance element.

In a third implementation of such an RF wireline communications system, the first termination reactance element having the first termination reactance value may be a first termination capacitance element having a first termination capacitance value, and the first termination capacitance element may be coupled inline in the first cable conductor adjacent to the first termination resistance element in a direction toward the functional circuitry.

A first instance of that third implementation may further include an additional resistance element in parallel with the first termination capacitance element.

In a second instance of that third implementation, the first reactance element may further include an inductance element in parallel with the first termination capacitance element, and the predetermined frequency characteristics may include a predetermined range of frequencies.

A method, in accordance with implementations of the subject matter of this disclosure, of filtering interference in a radiofrequency (RF) wireline communications system having a cable interface that couples a cable of the RF wireline communications system to functional circuitry of the RF wireline communications system, includes selecting for a first termination reactance element a first termination reactance value selected to direct signals, on a first cable conductor of the RF wireline communications system, having other than predetermined frequency characteristics, away from a system ground, selecting for a first termination resistance element a first termination resistance value selected as a pull-down resistance for interference signals having other than the predetermined frequency characteristics, that are not directed by the first termination reactance element away from the system ground, to cause the interference signals, having other than the predetermined frequency characteristics, to propagate to the system ground, coupling the first termination resistance element between the first cable conductor and the system ground, and coupling the first termination reactance element to the first termination resistance element.

A first implementation of such a method may further include, when the cable interface of the RF wireline communications system is a differential signal interface in which the first cable conductor is configured to carry one leg of a differential signal and a second cable conductor is configured to carry another leg of the differential signal, selecting for a second termination reactance element a second termination reactance value selected to direct signals, on the second cable conductor of the RF wireline communications system, having other than the predetermined frequency characteristics, away from the system ground, selecting for a second termination resistance element a second termination resistance value selected as a pull-down resistance for interference signals having other than the predetermined frequency characteristics, that are not directed by the second termination reactance element away from the system ground, to cause the interference signals, having other than the predetermined frequency characteristics, to propagate to the system ground, coupling the second termination resistance between the second cable conductor and the system ground, and coupling the second termination reactance element to the second termination resistance element.

A first variant of that first implementation may include selecting the second termination resistance value of the second termination resistance element to be equal to the first termination resistance value of the first termination resistance element.

A second variant of that first implementation may include selecting the second termination inductance value of the second termination inductance element to be equal to the first termination inductance value of the first termination inductance element.

In a second implementation of such a method, selecting the first termination reactance element may include selecting a first termination inductance element having a first termination inductance value.

In a first instance of that second implementation, coupling the first termination reactance element to the first termination resistance element may include coupling the first termination inductance element in series with the first termination resistance element between the first cable conductor and the system ground, and the predetermined frequency characteristics may include frequencies above a predetermined cutoff frequency.

In a first variant of that first instance of the second implementation, selecting the first termination resistance value of the first termination resistance element may include selecting the first termination resistance value to be between 330Ω and 500Ω, inclusive.

In a second variant of that first instance of the second implementation, selecting the first termination inductance value of the first termination inductance element may include selecting the first termination inductance value to be between 100 nH and 220 nH, inclusive, to block signals above a predetermined frequency between 100 MHz and 300 MHz, inclusive.

According to that second variant of the first instance of the second implementation, selecting the first termination inductance value of the first termination inductance element may include selecting the first termination inductance value to be 100 nH, to block signals above a predetermined frequency of 300 MHz.

In a second instance of that second implementation, coupling the first termination reactance element to the first termination resistance element may include coupling the first termination inductance element in series with an additional resistance element, between the first cable conductor and the system ground, and in parallel with the first termination resistance element.

In a third implementation of such a method, selecting the first termination reactance element having the first termination reactance value may include selecting a first termination capacitance element having a first termination capacitance value, and coupling the first termination reactance element to the first termination resistance element may include coupling the first termination capacitance element inline in the first cable conductor adjacent to the first termination resistance element in a direction toward the functional circuitry.

A first instance of that third implementation, may further include coupling an additional resistance element in parallel with the first termination capacitance element.

In a second instance of that third implementation, selecting the first termination reactance element may further include selecting also an inductance element, coupling the first termination reactance element to the first termination resistance element may further include coupling the inductance element in parallel with the first termination capacitance element, and the predetermined frequency characteristics may include a predetermined range of frequencies determined by the first termination capacitance element and the inductance element.

BRIEF DESCRIPTION OF THE DRAWINGS

Further features of the subject matter of this disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, wireline connections for some high-speed networking applications operate under various standards that include strict electromagnetic compatibility requirements incorporating cable shielding specifications. Those applications may include, but are not limited to, automotive Ethernet under the IEEE 802.3 bp, 802.3bw, 802.3ch and 802.3cy standards, as well as the A-PHY long-reach SerDes standard of the MIPI Alliance, Inc., and standards set by the NAV Alliance and the Automotive SerDes Alliance (ASA). However, the subject matter of this disclosure also may be relevant to other wireline radiofrequency (RF) signaling applications. Moreover, while the discussion that follows may focus primarily on common-mode interference in differential signaling, the subject matter of this disclosure also may be relevant to single-ended signaling. Further, the discussion that follows may be applicable to any high-speed wireline interface, whether the cabling used in the interface is shielded or unshielded.

While direct current signals can induce interference, this disclosure is concerned primarily with interference resulting from alternating current (AC) or RF signals. While the foregoing standards and other relevant standards require cables to be shielded and cable connectors to be grounded, in many situations, noise signals may be induced in cable shielding, and those noise signals may be difficult to disperse to ground. Such interference can also manifest as common-mode noise signals which flow in the same direction in the two opposite legs of a differential circuit. Various forms of filtering may then convert the common-mode noise to differential-mode noise that is additive to differential-mode signaling on the channel.

Typically, common-mode interference may be mitigated by a common-mode shunt. At the location of a common-mode shunt, the differential impedance $Z_{diff}$ may be approximated as:

$$Z_{diff} \approx (Z_{dm} \times Z_{cm})/(Z_{dm}+Z_{cm}) = (Z_{dm})/((Z_{dm}/Z_{cm})+1)$$

where:

$Z_{dm}$ is the trace reference differential mode impedance; and $Z_{cm}$ is the common-mode impedance.

Thus, as $Z_{cm} \rightarrow \infty$, $Z_{diff} \rightarrow Z_{dmf}$ while as $Z_{cm}=0$, $Z_{diff} \rightarrow 0$.

It follows that from a differential signaling perspective, it may be better to have larger $Z_{cm}$, so that $Z_{diff}$ is closer to $Z_{dm}$, which yields less distortion of the differential signal. However, from a common-mode noise filtering perspective, it may be better to have smaller $Z_{cm}$ (e.g., closer to the common-mode impedance of unshielded twisted-pair, or UTP, cable, which is about 250Ω), which decreases $Z_{diff}$, because that forms a low common-mode impedance ground return path, which can better filter out the common-mode noise by diverting more common-mode noise current from the channel to ground.

Therefore, in accordance with implementations of the subject matter of this disclosure, a cable termination in an RF wireline communications system is filtered in a manner that yields a small $Z_{cm}$ (e.g., close to 250Ω or lower) at lower frequencies (e.g., less than 100-300 MHz), but a larger $Z_{cm}$ (e.g., close to 330Ω or higher) at higher frequencies (e.g., greater than 100-300 MHz).

Implementations described herein may include an on-board discrete passive termination network with discrete surface-mount passive components. However, the subject matter of this disclosure may include other forms of termination including on-package and on-die termination circuitry, as well as termination circuitry in the cable connector.

A typical cable termination in an RF wireline communications system may include a pull-down resistance element to divert to ground certain noise components so that those components are filtered out and do not interfere with functional circuitry of the system such as a physical layer transceiver (PHY) or a processor; in a differential system, each leg may include such a pull-down resistance element. Typically, the resistance element may be a resistor, which may be either an on-board or on-package discrete passive resistor component, but other types of circuit element may be used to provide the desired resistance. However, such known pull-down arrangements may affect desired higher-frequency components as well as the undesirable lower-frequency interference components. Therefore, in implementations of the subject matter of this disclosure, a reactance element (i.e., a capacitance element or an inductance element), is coupled to the pull-down resistance element, allowing direct-current signals and lower frequency RF signals to be treated differently from higher frequency RF signals.

In some implementations, the reactance element is an inductance element (typically, the inductance element is an inductor but other types of circuit element may be used to provide the desired inductance), which acts as a short circuit to direct current signals and to lower frequencies, but as an open circuit to higher frequencies. The inductor is added in series with the termination resistance element between each respective leg and a system ground. Thus, the lower-frequency interference components are filtered to ground, while desired higher-frequency components remain. To improve the filtering of the lower-frequency components, the termination resistance may be lowered to lower $Z_{cm}$ to minimize $Z_{diff}$ for those components, but because of the inductance in the filter network circuitry, $Z_{diff}$ for the higher-frequency components remains closer to $Z_{dm}$.

For example, in a typical differential cable termination, the pull-down resistance value on each leg may be 1 kΩ, for a combined resistance value, on the two legs in parallel, of 500Ω. In accordance with implementations of this disclosure, in order to lower the common-mode impedance $Z_{cm}$, the pull-down resistance value on each leg may be lowered to between 330Ω and 500Ω, for a combined resistance value between 165Ω and 250Ω. The pull-down resistance value on one leg of a differential signal can be expected to be the same as the pull-down resistance value on the other leg of the differential signal. However, for multiple single-ended signals, as well as for separate adjacent differential pairs, the pull-down resistance value need not be the same, and may be deliberately different in order to improve signal integrity and/or EMC performance.

As noted above, in order to prevent pulling the desired high-frequency signals to ground through the termination pull-down resistance elements, an inductance element may be provided, in accordance with implementations of the subject matter of this disclosure, in series with each pull-down resistance element. Each inductance element acts as a higher impedance—effectively an open circuit—to higher frequencies, and therefore the desired higher-frequency signals are not filtered out by being pulled to ground by the pull-down resistance elements. At the same time, each inductance element acts as a lower impedance—effectively a short circuit—to lower frequencies, so that the undesirable lower frequency signals are filtered out by being pulled to ground. The particular value of the inductance element is a function of the particular application and its environment, but in representative implementations, the cut-off frequency, above which signals would not be filtered to ground, might be between 100 MHz and 300 MHz, inclusive. To achieve such a cut-off frequency, an inductance value between 100 nH and 220 nH, inclusive, may be used. In a particular representative implementation, for a cut-off frequency of 300 MHz, an inductance value of 100 nH may be used.

Although the foregoing discussion focuses on differential signaling implementations, implementations of the subject matter of this disclosure may be used in single-ended cable terminations. In such an implementation, the resistance value of the single pull-down termination resistance element may be between 330Ω and 500Ω, inclusive, and the inductance value of the single termination inductance element in series with the single pull-down termination resistance element may be between 100 nH and 220 nH, inclusive, with 100 nH used in a representative implementation having a 300 MHz cut-off frequency.

In other implementations, the reactance is a capacitance. Typically, the capacitance element is a capacitor but other types of circuit element may be used to provide the desired capacitance. Each capacitance element acts as a higher impedance—effectively an open circuit—to direct current signals and to lower frequencies, but as an effective short circuit to higher frequencies. The specific capacitance value is selected based on the desired cut-off frequency.

In capacitance-based implementations of the subject matter of this disclosure, the capacitor is added inline in the cable conductor adjacent to the point at which the termination resistance element is coupled, between that point and the system functional circuitry which is to be protected from the interference signals. Desired higher frequency components pass through the capacitance element to the system functional circuitry. However, the lower-frequency interference components are blocked, and therefore are diverted to ground via the termination resistance element.

In order for the interference components to be diverted after being blocked, the capacitor in capacitance-based implementations is coupled inline in the cable conductor adjacent to the point at which the termination resistance element is coupled to that cable conductor. As used in this description, and in the claims which follow, "adjacent" in this context means that the capacitor is not so far from the termination resistance element that the blocked signals can cause additional interference as they propagate back toward the termination resistance element to be diverted to ground. In theory, it is better to place the capacitor inline in the cable conductor as close as possible to the point at which the termination resistance element is coupled to that cable conductor. However, in practice, the circuit topology (e.g., the printed circuit layout) and manufacturing and assembly considerations may pose constraints on how close to that point the capacitor is placed.

The subject matter of this disclosure may be better understood by reference to FIGS. 1-8.

Figure 1:
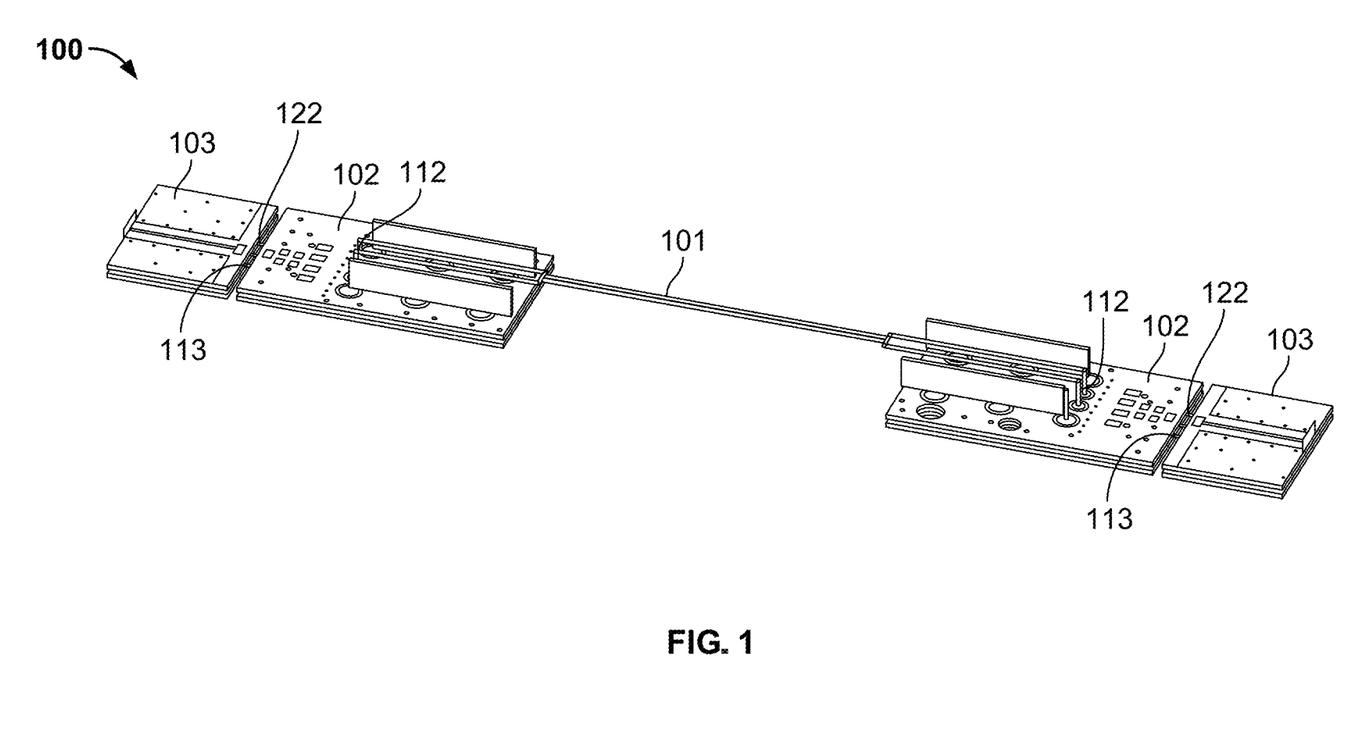
FIG. 1 shows a portion of a system in which implementations of the subject matter of this disclosure may be used.

FIG. 1 shows a portion 100 of a wireline RF communications system with which the subject matter of this disclosure may be used. Wireline RF communications system 100 includes a cable 101 which, in a differential embodiment, has at least two conductors and serves as the channel medium. Each end of cable 101 is connected to a respective interface 102, which is in turn coupled to a respective printed circuit board 103 on which may be mounted functional circuitry including, for example, a respective physical layer transceiver in the case of an Ethernet system.

Figure 2:
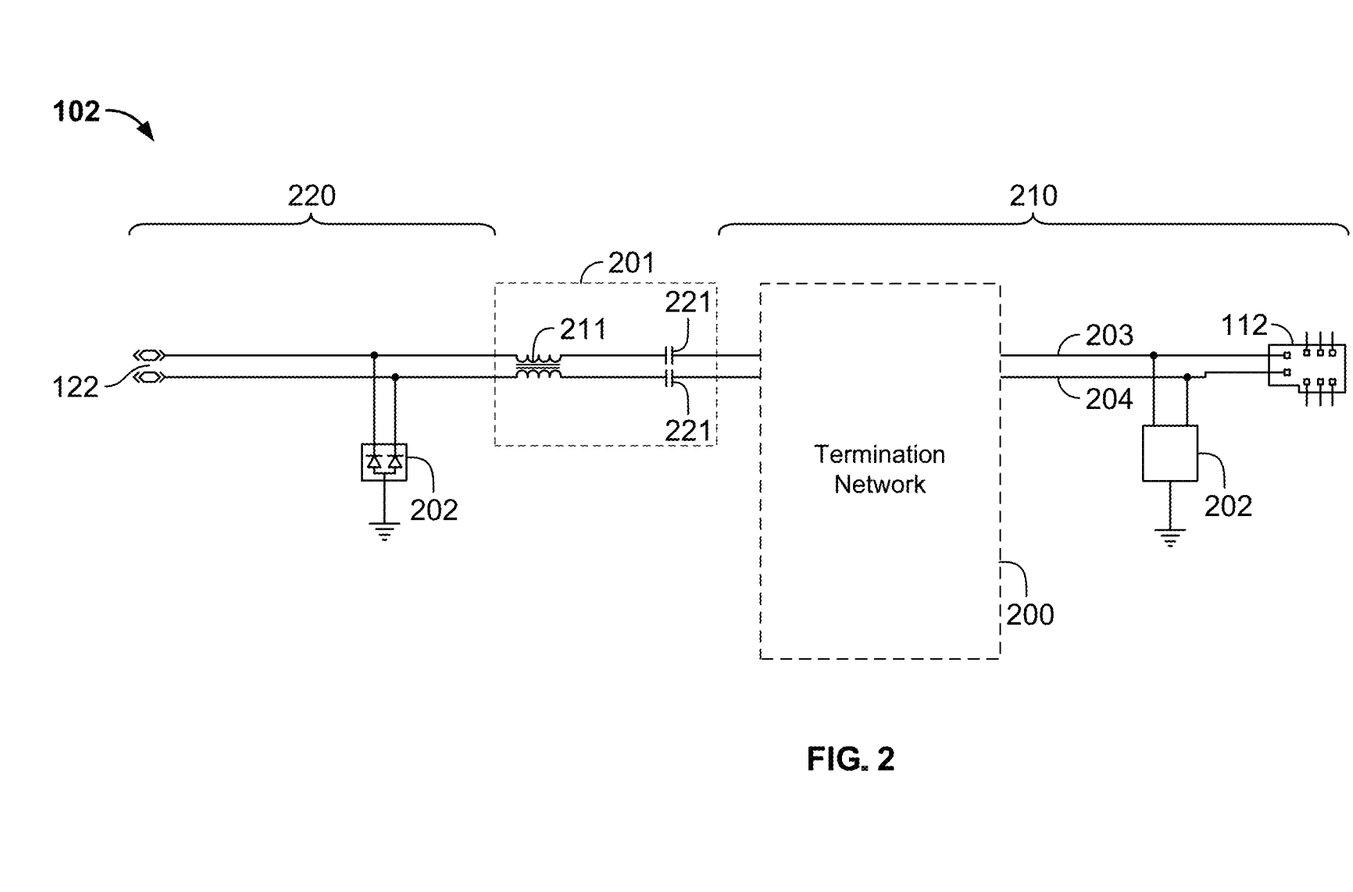
FIG. 2 is a schematic representation of circuitry in accordance with implementations of the subject matter of this disclosure.

In this implementation, interface 102—which may differ depending on the particular type of channel medium (e.g., cable 101) and therefore may be referred to as a medium-dependent interface (MDI)—includes a cable connector 112 and a connection 122 to pins 113 of printed circuit board 103. In accordance with implementations of the subject matter of this disclosure, interface 102 also includes termination network 200 (FIG. 2). As depicted in FIGS. 3-7, termination network 200 is a common-mode filter termination network, which is predicated on system 100 using differential signaling. However, system 100 may use single-ended signaling, and the differences that would appear in termination network 200 for the single-ended case also will be described below.

As seen in the more detailed view of FIG. 2, interface 102 includes, in addition to cable connector 112, connection 122 and termination network 200, a high-pass filter 201 including a common-mode choke 211 (e.g., a ferrite-bead choke) and AC-coupling capacitors 221. Each of the two interface segments created by high-pass filter 201—i.e., cable-side 210 and circuit-side 220—includes a respective electrostatic discharge device 202 to prevent any damaging build-up of static electric charge.

In this implementation, interface 102 includes a number of conduction paths equal to the number of conductors in cable 101. In differential signaling implementations such as that shown in FIG. 2, there are two conduction paths 203, 204.

Figure 3:
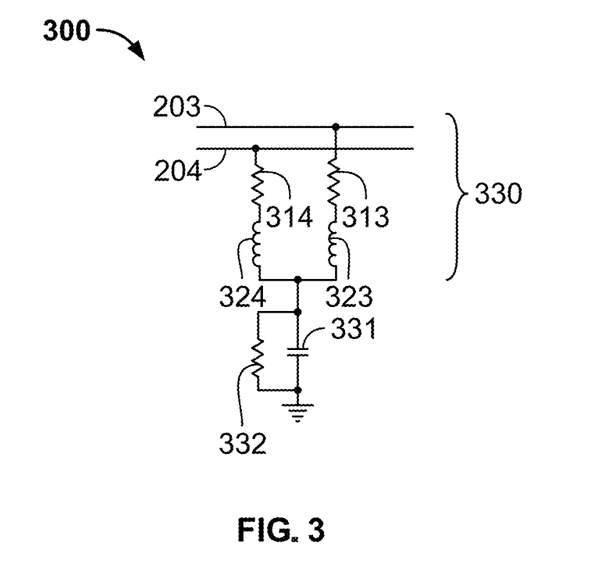
FIG. 3 is a schematic representation of an implementation of filter circuitry that may be used in the circuitry of FIG. 2.

FIG. 3 shows an implementation 300 of termination network 200, in which a common-mode filter termination network 330 in accordance with implementations of the subject matter of this disclosure is provided to mitigate or filter common-mode interference.

Common-mode filter termination network 330 is coupled to ground via capacitor 331, protected by resistor 332, to prevent a DC level shift in the signal on conduction paths 203, 204. Conduction path 203 is coupled to capacitor 331 by series-coupled resistor 313 and inductor 323, while conduction path 204 is coupled to capacitor 331 by series-coupled resistor 314 and inductor 324. The ground is a system ground, which in a stationary application may be a true earthed ground, but in a mobile application (such as an automotive Ethernet interface) may be a battery ground or chassis ground.

The values of resistor 313 and inductor 323, and of resistor 314 and inductor 324, are selected based on the particular circuit requirements to couple lower-frequency signal components, likely to be interference, to ground while preventing the coupling to ground of higher-frequency signal components which are likely to be the desired signal and to which inductors 323, 324 appear as an open circuit. As noted above, various types of circuit elements other than resistors and inductors might be used to provide the necessary resistances and inductances in place of resistors 313, 314 and inductors 323, 324.

In differential implementations, the values of resistor 314 and inductor 324 would be expected to be the same as the values of resistor 313 and inductor 323. However, for multiple single-ended signals, as well as for separate adjacent differential pairs, the values of resistor 314 and inductor 324 may be deliberately different from the values of resistor 313 and inductor 323 in order to improve signal integrity and/or EMC performance.

In addition, although inductors 323, 324 are shown as being disposed between resistors 313, 314 and system ground (by way of capacitor 331 in the illustrated implementation), the order of resistor 313 and inductor 323, and of resistor 314 and inductor 324, is not important, nor is the order of resistor 314 and inductor 324 necessarily the same as the order of resistor 313 and inductor 323

In some implementations according to the subject matter of this disclosure, the cutoff frequency—i.e., the frequency below which interference should be coupled to ground and above which signals should be prevented from coupling to ground—is between 100 MHz and 300 MHz. In such implementations, the values of resistors 313, 314 would be between 330Ω and 500Ω, inclusive, while the values of inductors 323, 324 would be between 100 nH and 220 nH, inclusive. In a particular implementation, with a cutoff frequency of 300 MHz, the values of resistors 313, 314 would be the same and would be either 330Ω or 500Ω, while the values of inductors 323, 324 would both be 100 nH.

As noted above, system 100 may use single-ended signaling instead of differential signaling. In such a case, for each signal path, there would be only one conduction path—e.g., conduction path 203. A termination in accordance with the subject matter of this disclosure in such an implementation would still include capacitor 331, protected by resistor 332, to prevent a DC level shift in the signal on the single conduction path 203. Conduction path 203 would be coupled to capacitor 331 by series-coupled resistor 313 and inductor 323, while resistor 314 and inductor 324 would be omitted.

As in differential implementations, the values of resistor 313 and inductor 323 in the single-ended case would be selected based on the particular circuit requirements to couple lower-frequency signal components, likely to be interference, to ground, while preventing the coupling to ground of higher-frequency signal components which are likely to be the desired signal and to which inductor 323 appears as an open circuit. In some such implementations, the cutoff frequency would be between 100 MHz and 300 MHz, inclusive, and the value of resistor 313 would be between 330Ω and 500Ω, inclusive, while the value of inductor 323 would be between 100 nH and 220 nH, inclusive. In a particular implementation, with a cutoff frequency of 300 MHz, the value of resistor 313 would be either 330Ω or 500Ω, while the value of inductor 323 would be 100 nH.

Figure 4:
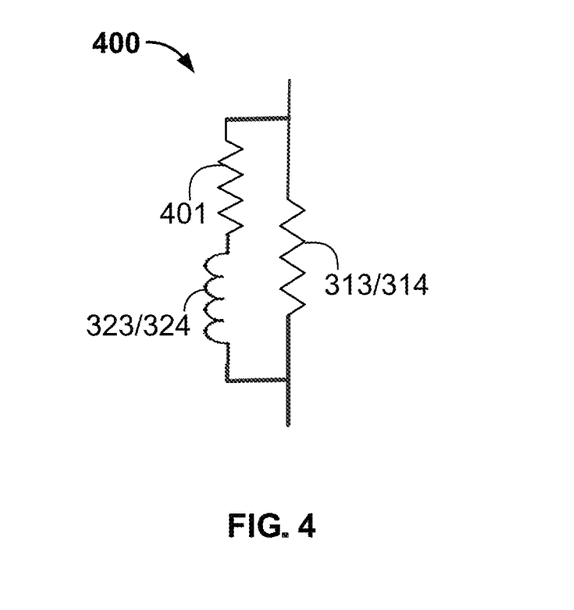
FIG. 4 is a partial schematic representation of an alternative to the filter circuitry of FIG. 3 that may be used in the circuitry of FIG. 2.

In an alternative implementation 400 shown partially in FIG. 4 (the remainder being similar to implementation 300), instead of being coupled in series with resistor 313/314, inductor 323/324 is coupled in series with additional resistor 401, and the series combination of resistor 401 and inductor 323/324 is coupled in parallel with resistor 313/314. According to this alternative, rather than ranging from the resistance of resistor 313/314 at low frequencies to infinity at high frequencies as in the implementation of FIG. 3, the combined impedance in the implementation of FIG. 4 ranges from the parallel combination of resistor 313/314 and resistor 401 at low frequencies, to the resistance of resistor 313/314 at high frequencies. If the resistance of resistor 401 is the same as the resistance of resistor 313/314, that combined impedance ranges from half the resistance of resistor 313/314 at low frequencies, to the full resistance of resistor 313/314 at high frequencies.

Figure 5:
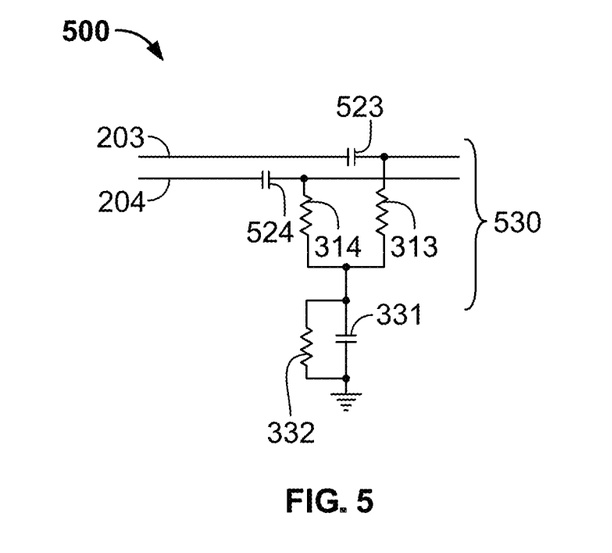
FIG. 5 is a schematic representation of another implementation of filter circuitry that may be used in the circuitry of FIG. 2.
Figure 6:
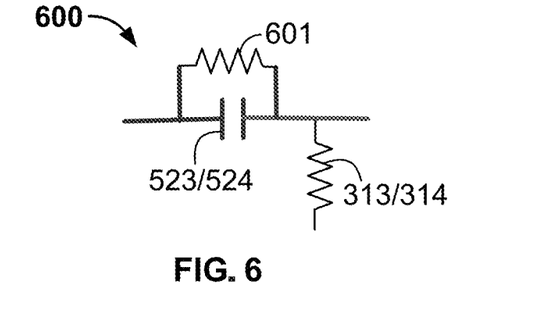
FIG. 6 is a partial schematic representation of an alternative to the filter circuitry of FIG. 5 that may be used in the circuitry of FIG. 2.
Figure 7:
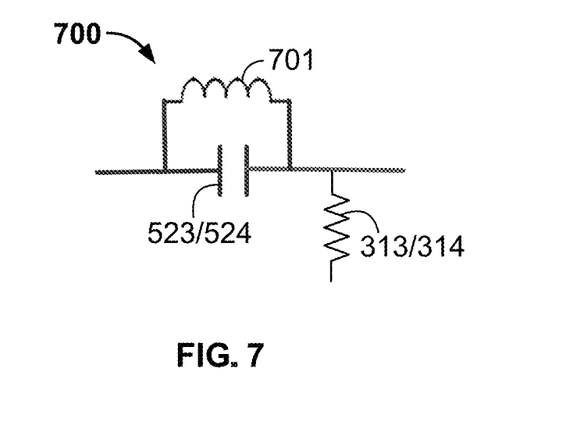
FIG. 7 is a partial schematic representation of another alternative to the filter circuitry of FIG. 5 that may be used in the circuitry of FIG. 2.

FIGS. 5-7 show implementations where the reactance element is a capacitor rather than an inductor.

FIG. 5 shows an implementation 500 of termination network 200, in which a common-mode filter termination network 530 in accordance with implementations of the subject matter of this disclosure is provided to mitigate or filter common-mode interference.

Common-mode filter termination network 530 is coupled to ground via capacitor 331, protected by resistor 332, to prevent a DC level shift in the signal on conduction paths 203, 204. Conduction path 203 is coupled to capacitor 331 by resistor 313, while conduction path 204 is coupled to capacitor 331 by resistor 314. The ground is a system ground, which in a stationary application may be a true earthed ground, but in a mobile application (such as an automotive Ethernet interface) may be a battery ground or chassis ground.

In this implementation, the reactance that provides for diversion of RF interference currents is a capacitance. Specifically, in this implementation a respective capacitor 523, 524 is coupled inline in respective conduction path 203, 204, adjacent to the point at which respective resistor 313, 314 is coupled to respective conduction path 203, 204. As noted above, as used in this description, and in the claims which follow, "adjacent" in this context means that the capacitor is not so far from the termination resistance element that the blocked signals cause additional interference as they propagate back toward the termination resistance element to be diverted to ground. As noted above, in theory, it is better to place respective capacitor 523, 524 inline in respective cable conductor 203, 204 as close as possible to the respective point at which respective termination resistor 313, 314 is coupled to respective cable conductor 203, 204. However, in practice, the circuit topology (e.g., the printed circuit layout) and manufacturing and assembly considerations may pose constraints on how close to that point the capacitor is placed.

As a result, at high frequencies, the RF signals destined for the functional circuitry pass through respective capacitor 523, 524. However, the values of capacitors 523, 524 are selected, based on the particular circuit requirements, to block lower-frequency signal components, likely to be interference, from passing through to the functional circuitry. In particular, the capacitance of each of capacitors 523, 524 is several times that of coupling capacitors 221, which block direct current signals but do not block RF interference currents. For example, in many implementations, each capacitor 221 may have a capacitance on the order of 100 nF, while each capacitor 523, 524 may have a capacitance on the order of between 700 nF and 900 nF.

Because the RF interference currents are blocked by capacitors 523, 524, they are diverted to ground via respective resistor 313, 314 and capacitor 331. It is for this reason that each capacitor 523, 524 should be coupled inline in its respective conduction path 203, 204 "adjacent to the point at which respective resistor 313, 314 is coupled to respective conduction path 203, 204" as defined above. If a capacitor 523, 524 is too far from the point at which respective resistor 313, 314 is coupled to respective conduction path 203, 204, then the blocked currents would have to propagate back through conduction path 203, 204, potentially causing additional interference before they could be diverted to ground.

In an alternative implementation 600 shown partially in FIG. 6 (the remainder being similar to implementation 500), each capacitor 523/524 is coupled in parallel with an additional resistor 601. Resistor 601 provides a current path for a DC component of the signal on conduction path 203/204. This may be needed for some applications that use DC signaling, or for applications that use AC signaling but have stringent DC requirements for the DC level.

In an alternative implementation 700 shown partially in FIG. 7 (the remainder being similar to implementation 500), each capacitor 523/524 is coupled in parallel with an additional inductor 701. While capacitor 523/524 blocks RF interference signals below a certain frequency, inductor 701 blocks RF signals above a certain frequency. This provides a frequency window that can be determined by selection of the capacitance of capacitor 523/524 and the inductance of inductor 701.

Figure 8:
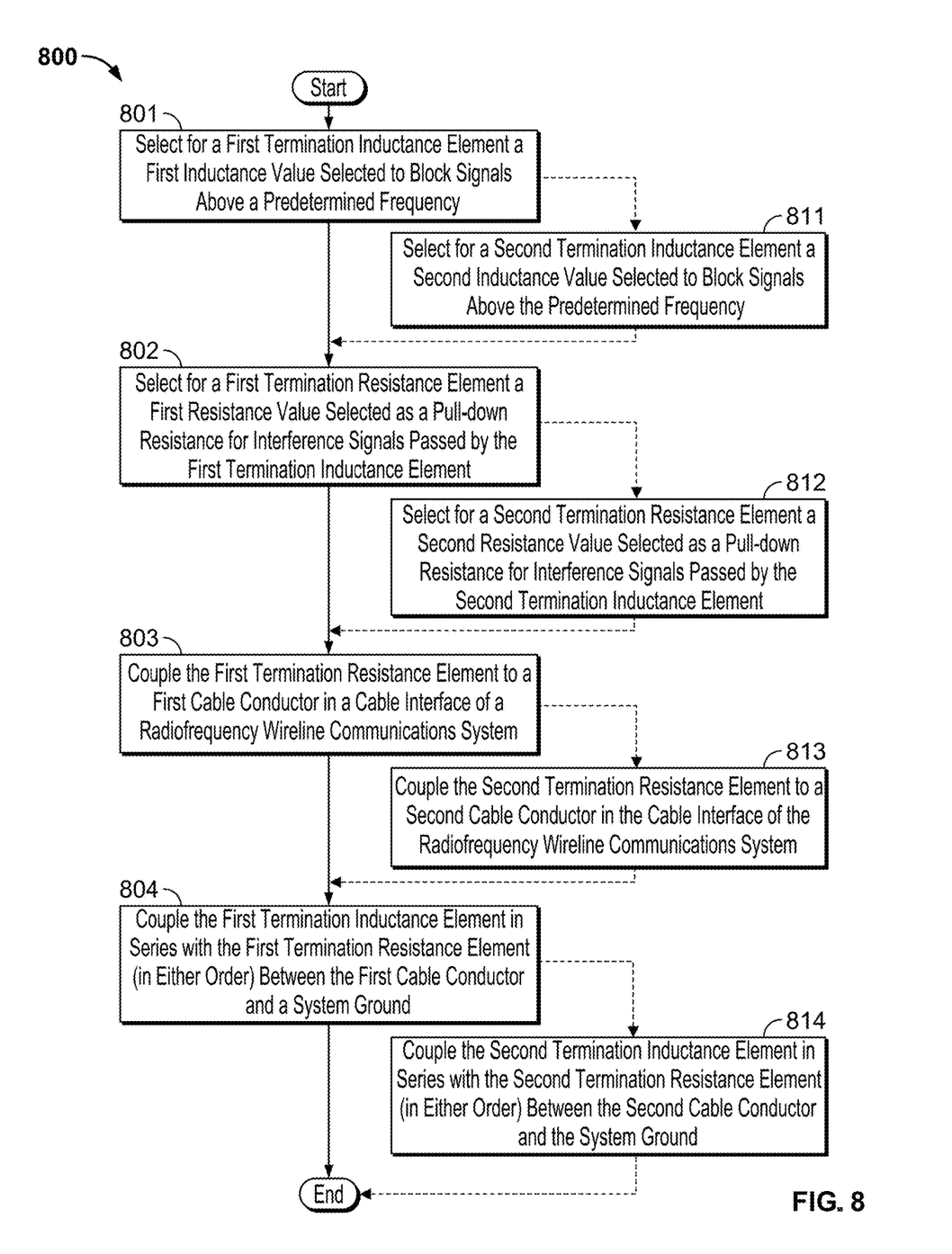
FIG. 8 is a flow diagram illustrating a method according to implementations of the subject matter of this disclosure.

A method 800 according to implementations of the subject matter of this disclosure is diagrammed in FIG. 8. Method 800 begins at 801 where a first termination inductance value is selected to block interference signals above a predetermined frequency from propagating from a first cable conductor of the RF wireline communications system to a system ground. At 802, a first termination resistance value is selected as a pull-down resistance to propagate to the system ground interference signals below the predetermined frequency that are passed by the first termination inductance element. At 803, a first termination resistance element having the first termination resistance value is coupled to a first cable conductor in a cable interface of a wireline communications system. At 804, a first termination inductance element having the first termination inductance value is coupled in series with the first termination resistance element (in either order) between the first cable conductor and the system ground, and method 800 ends.

Optionally, in a differential system, selecting 811, selecting 812, coupling 813 and coupling 814 are performed in parallel with selecting 801, selecting 802, coupling 803 and coupling 804. Specifically, at 811 a second termination inductance value is selected to block interference signals above a predetermined frequency from propagating from a second cable conductor of the RF wireline communications system to a system ground. At 812, a second termination resistance value is selected as a pull-down resistance to propagate to the system ground interference signals below the predetermined frequency that are passed by the second termination inductance element. At 813, a second termination resistance element having the second termination resistance value is coupled to a second cable conductor in the cable interface of the wireline communications system. At 814, a second termination inductance element having the second termination inductance value is coupled in series with the second termination resistance element (in either order) between the second cable conductor and the system ground.

Thus it is seen that improved filtering of common-mode noise in a high-speed cable interface, without impairing high-speed signaling, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A radiofrequency (RF) wireline communications system comprising:
   an interference filter for filtering interference noise at a cable interface that couples a cable of the RF wireline communications system to functional circuitry of the RF wireline communications system, the interference filter comprising:
   a first termination resistance element coupled between a first cable conductor and a system ground; and
   a first termination reactance element coupled to the first termination resistance element; wherein:
   the first termination reactance element has a first termination reactance value selected to direct signals on the first cable conductor, having predetermined frequency characteristics, away from the system ground; and
   the first termination resistance element has a first termination resistance value selected as a pull-down resistance for interference signals having lower frequency than the predetermined frequency characteristics, that are not directed by the first termination reactance element away from the system ground, to cause the interference signals, having the lower frequency than the predetermined frequency characteristics, to propagate to the system ground.

2. The RF wireline communications system of claim 1 further comprising, when the cable interface of the RF wireline communications system is a differential signal interface in which the first cable conductor is configured to carry one leg of a differential signal and a second cable conductor is configured to carry another leg of the differential signal:
   a second termination resistance element coupled between the second cable conductor and the system ground; and
   a second termination reactance element coupled to the second termination resistance element; wherein:
   the second termination reactance element has a second reactance value selected to direct signals on the second cable conductor, having the predetermined frequency characteristics, away from the system ground; and
   the second termination resistance has a second resistance value selected as a pull-down resistance for interference signals having the lower frequency than the predetermined frequency characteristics, that are not directed by the second termination reactance element away from the system ground, to cause the interference signals having the lower frequency than the predetermined frequency characteristics, to propagate to the system ground.

3. The RF wireline communications system of claim 2 wherein the second termination resistance value of the second termination resistance element is equal to the first termination resistance value of the first termination resistance element.

4. The RF wireline communications system of claim 2 wherein the second termination reactance value of the second termination reactance element is equal to the first termination reactance value of the first termination reactance element.

5. The RF wireline communications system of claim 1 wherein the first termination reactance element having the first termination reactance value is a first termination inductance element having a first termination inductance value.

6. The RF wireline communications system of claim 5 wherein:
the first termination inductance element is coupled in series with the first termination resistance element between the first cable conductor and the system ground; and
the predetermined frequency characteristics comprise frequencies above a predetermined cutoff frequency.

7. The RF wireline communications system of claim 6 wherein the first termination resistance value of the first termination resistance element is between 330Ω and 500Ω, inclusive.

8. The RF wireline communications system of claim 6 wherein the first termination inductance value of the first termination inductance element is between 100 nH and 220 nH, inclusive, to block signals above a predetermined frequency between 100 MHz and 300 MHz, inclusive.

9. The RF wireline communications system of claim 8 wherein the first termination inductance value of the first termination inductance element is 100 nH, to block signals above a predetermined frequency of 300 MHz.

10. The RF wireline communications system of claim 5 wherein the first termination inductance element is coupled in series with an additional resistance element, between the first cable conductor and the system ground, and in parallel with the first termination resistance element.

11. The RF wireline communications system of claim 1 wherein:
the first termination reactance element having a first termination reactance value is a first termination capacitance element having a first termination capacitance value; and
the first termination capacitance element is coupled inline in the first cable conductor adjacent to the first termination resistance element in a direction toward the functional circuitry.

12. The RF wireline communications system of claim 11 further comprising an additional resistance element in parallel with the first termination capacitance element.

13. The RF wireline communications system of claim 11 wherein:
the first reactance element further comprises an inductance element in parallel with the first termination capacitance element; and
the predetermined frequency characteristics comprise a predetermined range of frequencies.

14. A method of filtering interference in a radiofrequency (RF) wireline communications system having a cable interface that couples a cable of the RF wireline communications system to functional circuitry of the RF wireline communications system, the method comprising:
selecting for a first termination reactance element a first termination reactance value selected to direct signals, on a first cable conductor of the RF wireline communications system, having lower frequency than predetermined frequency characteristics, away from a system ground;
selecting for a first termination resistance element a first termination resistance value selected as a pull-down resistance for interference signals having the lower frequency than the predetermined frequency characteristics, that are not directed by the first termination reactance element away from the system ground, to cause the interference signals, having the lower frequency characteristics than the predetermined frequency characteristics, to propagate to the system ground;
coupling the first termination resistance element between the first cable conductor and the system ground; and
coupling the first termination reactance element to the first termination resistance element.

15. The method of claim 14 further comprising, when the cable interface of the RF wireline communications system is a differential signal interface in which the first cable conductor is configured to carry one leg of a differential signal and a second cable conductor is configured to carry another leg of the differential signal:
selecting for a second termination reactance element a second termination reactance value selected to direct signals, on the second cable conductor of the RF wireline communications system, having the lower frequency than the predetermined frequency characteristics, away from the system ground;
selecting for a second termination resistance element a second termination resistance value selected as a pull-down resistance for interference signals having the lower frequency than the predetermined frequency characteristics, that are not directed by the second termination reactance element away from the system ground, to cause the interference signals, having the lower frequency than the predetermined frequency characteristics, to propagate to the system ground;
coupling the second termination resistance between the second cable conductor and the system ground; and
coupling the second termination reactance element to the second termination resistance element.

16. The method of claim 15 comprising selecting the second termination resistance value of the second termination resistance element to be equal to the first termination resistance value of the first termination resistance element.

17. The method of claim 15 comprising selecting the second termination inductance value of the second termination inductance element to be equal to the first termination inductance value of the first termination inductance element.

18. The method of claim 14 wherein selecting the first termination reactance element comprises selecting a first termination inductance element having a first termination inductance value.

19. The method of claim 18 wherein:
coupling the first termination reactance element to the first termination resistance element comprises coupling the first termination inductance element in series with the first termination resistance element between the first cable conductor and the system ground; and
the predetermined frequency characteristics comprise frequencies above a predetermined cutoff frequency.

20. The method of claim 19 wherein selecting the first termination resistance value of the first termination resistance element comprises selecting the first termination resistance value to be between 330Ω and 500Ω, inclusive.

21. The method of claim 19 wherein selecting the first termination inductance value of the first termination inductance element comprises selecting the first termination inductance value to be between 100 nH and 220 nH, inclusive, to block signals above a predetermined frequency between 100 MHz and 300 MHz, inclusive.

22. The method of claim 21 wherein selecting the first termination inductance value of the first termination inductance element comprises selecting the first termination inductance value to be 100 nH, to block signals above a predetermined frequency of 300 MHz.

23. The method of claim 18 wherein coupling the first termination reactance element to the first termination resistance element comprises coupling the first termination inductance element in series with an additional resistance element, between the first cable conductor and the system ground, and in parallel with the first termination resistance element.

24. The method of claim 14 wherein:
   selecting the first termination reactance element having the first termination reactance value comprises selecting a first termination capacitance element having a first termination capacitance value; and
   coupling the first termination reactance element to the first termination resistance element comprises coupling the first termination capacitance element inline in the first cable conductor adjacent to the first termination resistance element in a direction toward the functional circuitry.

25. The method of claim 24 further comprising coupling an additional resistance element in parallel with the first termination capacitance element.

26. The method of claim 24 wherein:
   selecting the first termination reactance element further comprises selecting also an inductance element;
   coupling the first termination reactance element to the first termination resistance element further comprises coupling the inductance element in parallel with the first termination capacitance element; and
   the predetermined frequency characteristics comprise a predetermined range of frequencies determined by the first termination capacitance element and the inductance element.

* * * * *